United States Patent

[11] 3,631,272

| [72] | Inventors | Toshifumi Kirii;<br>Toshihide Hanada, both of Kanagawa, Japan |
|---|---|---|
| [21] | Appl. No. | 32,682 |
| [22] | Filed | Apr. 28, 1970 |
| [45] | Patented | Dec. 28, 1971 |
| [73] | Assignee | Pioneer Electronic Corporation<br>Tokyo, Japan |
| [32] | Priorities | Apr. 4, 1969 |
| [33] | | Japan |
| [31] | | 44/40152;<br>June 24, 1969, Japan, No. 44/59144 |

[54] DC ELECTRIC MOTOR USING HALL ELEMENTS
4 Claims, 3 Drawing Figs.

[52] U.S. Cl. .................................................. 310/10, 310/46
[51] Int. Cl. ............................................... H02k 37/00
[50] Field of Search ........................................... 310/10, 46, 67, 153, 40, 219; 324/45; 318/254, 138

[56] References Cited
UNITED STATES PATENTS

| 3,293,457 | 12/1966 | Mori et al. ...................... | 310/10 |
| 3,483,456 | 12/1969 | Brunner et al. ................ | 318/138 |
| 3,200,316 | 8/1965 | Engel ............................. | 318/138 |
| 3,230,434 | 1/1966 | Bauerlein ....................... | 318/138 |
| 3,018,395 | 1/1962 | Carlstein ........................ | 310/40 |

*Primary Examiner*—D. X. Sliney
*Attorney*—Sughrue, Rothwell, Mion, Zinn & Macpeak ABSTRACT: A DC electric motor has a groove formed perpendicular to the rotating direction of a rotor at the center of the peripheral surface of one or more poles of a stator. A plurality of Hall elements are disposed at the center of a substrate which is inserted into said groove.

INVENTORS
TOSHIFUMI KIRII
TOSHIHIDE HANADA

BY Sughrue, Rothwell, Mion, Zinn & Macpeak
ATTORNEYS

DC ELECTRIC MOTOR USING HALL ELEMENTS

BACKGROUND OF THE INVENTION

1. Field of the Invention

This invention relates to a DC electric motor using Hall elements and more particularly to a device for mounting the Hall elements thereto.

2. Description of the Prior Art

Conventional DC electric motors have the Hall elements corresponding to the brushes of the normal DC electric motor. If armature reaction is considered, the Hall elements must be so disposed as to be displaced a little corresponding to the amount of rectified angle opposite the rotating direction of the rotor. However, in a reversible electric motor, it is not so easy to adjust the mounting disposition of the Hall elements in response to variation in the rotating direction. Particularly, in a compact electric motor such as a micromotor, it is impossible to adjust the mounting of the Hall element during usage.

Further, the conventional DC electric motor using Hall elements has a permanent magnet rotor, an armature stator, windings wound in layers on projected poles respectively of the stator, grooves formed on the outer periphery of the respective poles and Hall elements inserted into the respective grooves. In such a conventional electric motor, the structure for mounting the Hall elements must be made of silicon steel sheet and inserted into the respective grooves of the projected poles, and yet the grooves formed on the projected poles of the stator must be cut so as to accurately form a right angle at the respective edges thereof in order to fix the Hall elements flatly to the outer periphery of the stator. The stamping press must be accurately adjusted so as to provide such grooves on the poles of the stator which causes its manufacturing cost to be increased.

SUMMARY OF THE INVENTION

This invention eliminates the aforementioned disadvantages of the conventional electric motor and provides a novel and improved DC electric motor using Hall elements which provides the same functions and operation for both normal and reverse operation of the motor.

The present invention provides a DC electric motor which reduces the irregularity of the rotation due to the interaction of the magnetic poles of the rotor and those of the stator with each other. The DC electric motor may be manufactured readily and less expensively than the conventional one in mass production.

It is still another object of this invention to provide a device for mounting Hall elements in a DC electric motor which is simpler in structure and less expensive in cost than conventional motors.

According to one aspect of the present invention, there is provided a DC electric motor using a plurality of Hall elements which comprises a rotor including a rotor cover of magnetic conductive material, a permanent magnet and a rotary shaft. A stator includes an iron core for windings wound on the core, bearings disposed at the central portion of the core for bearing the rotary shaft. The bearing includes a support for mounting a printed circuit substrate of an electric circuit, a Hall element substrate including, Hall elements and terminals mounted on the substrate and conductors between the printing substrates and the terminals. The cores include magnetic poles and grooves formed on the outer surface of the poles and are provided at the central position of the peripheral direction of the surface of the magnetic poles of the core and also formed perpendicularly with respect to the rotating direction of the rotor. The center of the Hall elements are disposed generally at the center of the substrate whereby the substrates are fixed to respective grooves.

According to another aspect of this invention, there is provided a device for mounting Hall elements in a DC electric motor which comprises a pole projecting outwardly from an armature of an electric motor and also formed in an arcuate shape generally parallel to the inner peripheral surface of a rotor of the electric motor so that the top of the arcuate surface of the pole is cut flatly in such a manner that when the longitudinal length of the section of the Hall element is superimposed in parallel with the longitudinal length of cut portion of the arcuate top the Hall element generally contacts the interior of the cut portion of the arcuate top.

The other objects, advantages and features of the present invention will further become apparent from the following description taken in conjunction with the accompanying drawings.

DESCRIPTION OF THE PREFERRED EMBODIMENTS

Figure 1:
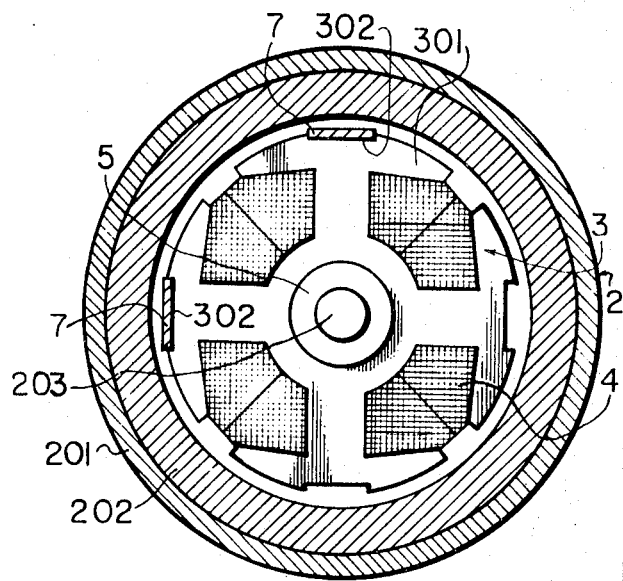
FIG. 1 is a sectional view of a DC electric motor constructed in accordance with this invention taken along the line 1—1 of FIG. 2.
Figure 2:
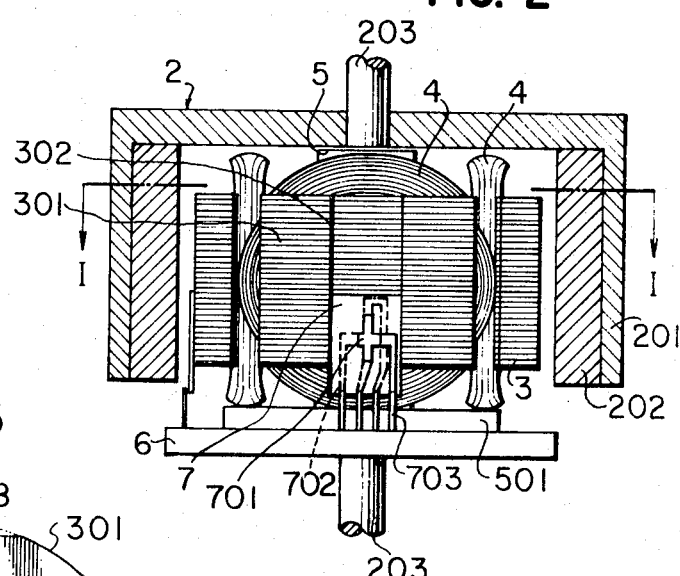
FIG. 2 is a side sectional view of the electric motor of FIG. 1.

Reference is made to the drawings, and particularly to FIGS. 1 and 2, which show one embodiment of this invention. The DC electric motor comprises a rotor 2 which includes a rotor cover 201 made of magnetic conductive material, a permanent magnet 202 and a rotary shaft 203. A stator includes an iron core 3, windings 4 wound on the iron core 3, bearings 5 disposed at the central portion of the iron core 3 for bearing the rotary shaft 203. Bearing 5 includes a support 501 for mounting a printed circuit substrate 6 of an electric circuit, a Hall element substrate 7 which includes Hall elements 701, terminals 702 mounted thereon, and conductors 703 mounted on the substrate 7. Iron core 3 includes magnetic poles 301 on the outer surface of which the Hall element substrate 7 is provided and grooves 302 formed on the outer surface of the poles 301 and provided at the central position of the peripheral direction of the surface of the magnetic poles 301 of the iron core 3 and also formed perpendicularly with respect to the rotating direction of the rotor 2. The center of the Hall elements 701 are disposed generally in the center of the Hall element substrate 7. Then, the Hall element substrate 7 is inserted into the groove 302. In this case, the Hall element 701 is disposed on the surface of the magnetic pole 301, and the terminals 702 of the Hall elements 701 projected from the lower end of the iron core 3 so that the conductors 703 may be readily wired on the printed circuit substrate 6.

Thus, it is understood from the foregoing description that in the DC electric motor of this invention the mounting of the Hall elements is easy. The Hall element may be accurately disposed at the center of the magnetic pole of the stator and the pole, with the result that the magnetic flux is effectively crossed with the Hall elements. The same function and operation may be obtained in case that the electric motor rotates both in a normal forward direction and in a reverse direction thereto.

It should be also understood that since the Hall element substrate does not project over the surface of the magnetic pole 301 due to the provision of the grooves 302, the gap between the rotor and stator may be made narrow with the result that the efficiency of the motor is improved. Further, it should be understood that since the grooves 302 are provided on the magnetic poles 301 to which the Hall element substrate 7 is not mounted, if the rotor 2 rotates, lack of uniformity and irregularity of rotation between the interactions of the magnetic poles of the rotor and that of the stator are reduced. It should be also understood that since the terminals of the Hall elements and conductors projected from the lower end of the iron core, the problem of insulation need not be considered.

It should be understood from the foregoing description that though the embodiment of this invention relates to a DC electric motor of the external rotor type, this invention may also be applied to a DC electric motor of the internal rotor type.

Figure 3:
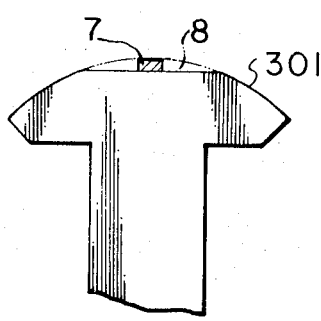
FIG. 3 is a plan view of a main portion of the device for mounting Hall elements in the electric motor of this invention.

Referring now to FIG. 3, which shows a main part of a device for mounting Hall elements in the electric motor of this invention, the device comprises a pole 301 projected outwardly from an armature of an electric motor and formed in an arcuate shape generally parallel to the inner peripheral surface of a rotor 2 of the electric motor. The top of the arcuate surface of the pole 301 is cut flatly in such a manner that when the longitudinal length of the section of the Hall element 7 is superimposed in parallel with the longitudinal length of cut portion of the arcuate top the Hall element may generally contact with interior of the cut portion of the arcuate top. If the Hall element 7 is directly adhered onto the outer periphery of the projected pole having the arcuate top, it projects into the magnetic gap the thickness of the Hall element 7 as in the conventional electric motor. This invention contemplates cutting flatly part of the top of the projected pole 301 so as to eliminate such disadvantage of the conventional structure. This cut portion 8 is so formed that when the longitudinal length of the section of the Hall element 7 is superimposed in parallel with the longitudinal length of cut portion 8 of the arcuate top, the Hall element may generally contact the inner surface of the cut portion of the arcuate top. In FIG. 3, dotted line designates the outer periphery of the cut portion 8.

It is understood from the foregoing description that since the top end of the projected pole 301 is thus cut so that the Hall element 7 adheres to the flat portion, the Hall element 7 need not project beyond the outer periphery of the projected pole 301 of radius with the result that it may not disturb the rotation of the motor. Thus, the present invention may provide a device for mounting the Hall element readily and less expensively without the disadvantages of the conventional electric motor.

What is claimed is:

1. In a DC electric motor comprising a rotor and stator, a field winding and Hall elements, the improvement comprising: means for supporting one or more Hall elements on said stator wherein said supporting means comprises a Hall element substrate having said Hall elements and terminals mounted thereon, and said motor further includes: a printed circuit substrate and terminals, an iron core including magnetic poles, grooves formed on the outer surface of said iron core poles at a central position in the peripheral direction of the pole surface of said iron core and formed perpendicular with respect to the rotating direction of said rotor, and the center of said Hall elements being disposed substantially in the center of said substrate.

2. A DC electric motor comprising a rotor including a rotor cover of magnetic conductive material, a permanent magnet and a rotary shaft, a stator including an iron core, windings wound on the iron core, bearings disposed at the center of said iron core for bearing the rotary shaft, a support for mounting a printed circuit substrate, a Hall element substrate including Hall elements and terminals mounted thereon, conductors connecting the printed circuit substrate and the terminals, said iron core including magnetic poles, grooves formed on the outer surface of the poles at the center thereof in the peripheral direction and formed perpendicular with respect to the rotating direction of said rotor, and the center of the Hall elements being disposed substantially in the center of said Hall element substrate.

3. A device for mounting Hall elements in a DC electric motor comprising: a pole projecting outwardly from the armature of the motor and of arcuate shape, substantially parallel to the inner peripheral surface of the rotor of the motor, the top of said arcuate surface of said pole being cut flatly and wherein the longitudinal length of the section of said Hall element is superimposed parallel to the longitudinal length of the cut portion of the arcuate top with the Hall element in substantial contact with the inner surface of said cut portion of the arcuate armature top.

4. In a DC electric motor comprising a rotor, stator, and Hall elements, said stator including field windings for providing magnetic poles to said stator, the improvement comprising: means for supporting one or more Hall elements on said stator, said means for supporting including, grooves formed on the outer surface of said stator in at least some of the areas of the stator which comprise magnetic poles and Hall element substrates having said Hall elements and terminals mounted thereon, said Hall substrates being mounted in said grooves.

* * * * *